Patented Sept. 23, 1941

2,256,877

UNITED STATES PATENT OFFICE 2,256,877

WETTING, PENETRATING, FOAMING, AND DISPERSING AGENT

Heinrich Bertsch, Chemnitz, Saxony, Germany, assignor to American Hyalsol Corporation, Wilmington, Del., a corporation of Delaware No Drawing. Application August 13, 1937, Serial No. 158,871

15 Claims. (Cl. 28—1)

This invention relates to organic salts of sulfonated higher aliphatic alcohols.

It is known to the prior art that hetero compounds of the nature of pyridine possess wetting and penetrating properties, because of which properties they are frequently employed in the textile and leather industries as additions to treating liquors. An object of the present invention is to provide a series of compounds which possesses superior wetting, penetrating and other properties valuable particularly to the fiber treating industries.

In accordance with the invention, products are provided which may be referred to collectively as neutralization products or salts of strong organic bases with sulfonated higher aliphatic alcohols having at least 8 carbon atoms in the molecule. These products not only possess good wetting and penetrating properties but they also have the valuable quality of imparting an excellent feel or handle to textile materials, because of which fact they are especially suitable as addition agents in finishing, softening and levelling operations.

Of the organic bases, the heterocyclic compounds of the nature of pyridine and its homologues or their derivatives are especially suitable, for example, methyl pyridine, picoline, piperidine and amino pyridine. Aliphatic, aromatic and mixed aliphatic-aromatic bases are also suitable, examples of the same being methyl amine, ethyl amine, triethyl amine, triethanol amine, aniline, methyl aniline and benzyl amine. From these examples, it will be observed that primary, secondary and tertiary amines may be employed. Various other lower and higher molecular alkyl amines similar to those given may be employed.

The alcohols used in the production of the compounds of the present invention may be described as higher molecular aliphatic alcohols having at least 8 carbon atoms in the molecule. These alcohols, preferably have from 12 to 22 carbon atoms and may be saturated or unsaturated and/or hydroxy substituted. Primary alcohols are preferably used for they generally lead to superior products, but secondary alcohols may be employed if they can be obtained in a stable and sufficiently pure state.

The products are easily prepared by carefully heating a mixture of the sulfonated fatty alcohols and the organic base in about molecular proportions. In some instances, the reaction occurs more satisfactorily at lower temperatures. The sulfonated alcohols used in the reaction may be prepared satisfactorily by reacting concentrated sulfuric acid, oleum or chlorsulfonic acid with higher molecular alcohols, either without the presence of other agents or diluents, or, if desired, with the aid of lower aliphatic acids or their anhydrides or chlorides or of inorganic acids. According to the conditions existing during the sulfonation reaction, either sulfuric acid esters are obtained or true aliphatic sulfonic acids, the latter product being formed by replacement of methylene hydrogen in the carbon chain. Both types of compounds are within the scope of the present invention, for each is capable of combining with the organic bases herein described.

The products formed are salt-like compounds resulting in accordance with the following illustrative formula:

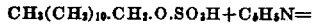

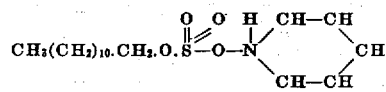

The pyridinium salt formed by this reaction comprises the acid sulfuric acid ester of the higher molecular aliphatic alcohol, lauryl alcohol. If the sulfonation conditions are such as to produce true sulfonic acids, similar salt-like neutral compounds are produced which differ from the products represented in the above formula only in that the group —SO$_3$.NH.C$_5$H$_5$ is attached directly to carbon instead of through an oxygen atom.

These salt-like compounds produced in accordance with the present invention are completely neutral. They are distinctly advantageous as compared with the free or un-neutralized higher molecular sulfo acids since they do not become attached upon the fibers as do these acids which dull the colors of the dye upon dyed textile materials.

*Example 1*

One hundred and eighty-six kgs. of lauryl alcohol are heated to the melting point and sulfonated at this temperature with 116 kgs. of chlorsulfonic acid. Next, 140 kgs. of pyridine are added to the crude sulfonation product during stirring, whereupon the reaction mass gradually solidifies.

*Example 2*

Two hundred and seventy kgs. of stearyl alcohol are sulfonated at 100° C. with 116 kgs. of chlorsulfonic acid. Then 150 kgs. of technical pyridine bases are added with stirring to the sulfonation product.

*Example 3*

One hundred kgs. of a mixture of fatty alcohols consisting primarily of lauryl alcohol and obtained from cocoanut oil by esterification of the fatty acids derived therefrom with ethyl alcohol reduction of the ethyl esters, distillation of the product of the reduction and collection of the first 50 to 60% of the distillate, are heated to a melting temperature of about 30° C. and treated at this temperature with 50 kgs. of chlorsulfonic acid. When a sample of the mixture proves to be completely soluble in water, 80 parts of 2-methyl-pyridine (alpha-picoline) are added during stirring while the mass is carefully heated at about 50° C.

*Example 4*

A portion of the same mixture of fatty alcohols described in Example 3, amounting to 100 kgs., is treated with 70 kgs. of fuming sulfuric acid (10% $SO_3$) at a temperature of 50° C. until a sample proves to be completely soluble in water. Then, a mixture of pyridine and its lower homologues derived by distillation of tar and having 50% thereof boiling lower than 140° C. and 90% thereof boiling at more than 160° C., is added during energetic stirring.

*Example 5*

One hundred kgs. of a mixture of fatty alcohols obtained by the catalytic reduction of spermaceti through the action of hydrogen and a copper catalyst at a temperature between 300 and 350° C. and a pressure of 150 to 200 atmospheres, which action is continued until the acid number has wholly disappeared, are sulfonated at a temperature of 35° C. with 60 kgs. of chlorsulfonic acid. The product obtained is poured into 200 kgs. of ice water and is then neutralized by means of 85 kgs. of triethyl amine.

*Example 6*

One hundred kgs. of oleyl alcohol are sulfated at 25° C. with 80 kgs. of concentrated sulfuric acid. The product obtained is poured into 150 kgs. of ice water and is then neutralized by the addition of piperidine.

*Example 7*

One hundred kgs. of a mixture of unsaturated and saturated fatty alcohols obtained by the reduction of cocoanut oil through the action of an alkali metal and butyl alcohol, adding water, separating the resulting aqueous alkali hydroxide solution and removing the butyl alcohol by distillation, are treated with 80 kgs. of chlorsulfonic acid at 35° C. The resulting product is further treated in the same manner as described in Example 5 but is neutralized with 80 kgs. of gamma-amino-pyridine.

*Example 8*

One hundred kgs. of ricinoleyl alcohol are treated with 150 kgs. of concentrated sulfuric acid at a temperature between 10 and 20° C. The product is treated in the same manner as described in Example 3 but is neutralized through the action of alpha-methyl-quinoline (quinaldine). The ricinoleyl alcohol employed may be satisfactorily obtained by reduction of ricinoleic acid by means of sodium and amyl alcohol, then adding water, separating the aqueous alkali hydroxide solution and finally removing the amyl alcohol by distillation.

*Example 9*

One hundred kgs. of stearyl alcohol are treated at 40 to 50° C. with 50 kgs. of chlorsulfonic acid. The reaction is continued until a sample of the product proves to be water soluble. Thereafter, the mass is heated to 65° C. and 90 kgs. of aniline are added during stirring.

*Example 10*

One hundred kgs. of a mixture of alcohols consisting mainly of cetyl alcohol and oleyl alcohol are mixed with 100 kgs. of concentrated sulfuric acid at 40° C. The mass is then poured into 200 kgs. of ice water. The mixture is neutralized by addition of 100 kgs. of benzyl amine.

The mixture of alcohols used in this example may be obtained by saponification of spermaceti oil by means of caustic lime and distillation of the product obtained, which process is in accordance with the disclosure of the United States Patent No. 1,290,870. The alcohols obtained in this manner have an iodine number of about 50.

*Example 11*

One hundred kgs. of linoleyl alcohol obtained by reduction of linoleic acid by means of an alkali metal and ethyl alcohol in a manner known per se are dissolved in 50 kgs. of water-free ethyl ether and treated with 200 kgs. of concentrated sulfuric acid at a temperature between about 0 and 5° C., the treatment being continued for several hours. The reaction product obtained in this manner is mixed with 300 kgs. of chipped ice and 50 kgs. of ethyl ether. It is washed with saturated Glauber's salt solution and finally is neutralized by the addition of triethanol amine.

The products obtained by the reactions described in the foregoing examples are readily soluble in water and have strong wetting and foaming properties. They are especially suitable for use in the textile industry as wetting and penetrating agents and also in the washing of cotton, wool, silk, rayon and other natural and synthetic fibers, as well as combinations thereof. They may also be used in such industry in the production of or in conjunction with pigments or dyes in their application to textile or other materials. In the leather industry, they may be employed in dyeing, tanning and other processes common in such art. They may be used in hospitals and in the household for pharmaceutical and other purposes connected with the person such as in shampoos, salves, creams, etc. They are also adapted for use in paper making, in metal working industries, as in boring oils, in the preparation of vermicides, as insecticides, in dust fixing agents, in emulsions, such as polishes and waxes, in paints, varnishes, lacquers, plastic compositions and rubber. From the foregoing uses, it is evident that the compounds of the present invention are of general use and may be employed wherever wetting, penetrating and transference of active constituents, emulsifying, cleaning or cleansing, softening, plasticizing and foaming, are desired.

This application is a continuation-in-part of applicant's copending application Serial No. 440,615, filed March 31, 1930.

It should be understood that the present invention is not limited to the specific materials described herein but that it extends to all equivalent materials coming within the scope of the claims appended hereto.

It should be understood further that the terms "alcohols" and "alcohol" employed herein and in the appended claims have been used in their strict sense and that they do not include hydroxy carboxylic acids.

I claim:

1. Salts of sulfonated higher aliphatic alcohols having at least 8 carbon atoms in the molecule with strong organic bases.

2. A fiber treating agent for use in the textile and leather industries which consists essentially of a salt of a sulfonate of a higher aliphatic alcohol having at least 8 carbon atoms in the molecule, said salt having been produced by the reaction of a strong organic base with said sulfonate.

3. In processes of finishing and softening of textiles and leather, the step comprising treating said materials with a salt of a sulfonated higher aliphatic alcohol having at least 8 carbon atoms in the molecule, the salt forming radical being that of a strong organic base.

4. Salts of strong nitrogeneous organic bases with sulfonated higher aliphatic alcohols having from 12 to 22 carbon atoms in the molecule.

5. Salts of aliphatic-aromatic amine bases with sulfonated higher aliphatic alcohols having at least 8 carbon atoms in the molecule.

6. Methyl aniline salts of sulfonated higher aliphatic alcohols having at least 8 carbon atoms in the molecule.

7. A pyridine salt of a sulfonated higher molecular alcohol containing at least 8 carbon atoms in the molecule.

8. Pyridine salt of lauryl sulfate.

9. Treating liquors for use in the fiber preparation industries for finishing, softening, levelling or the like which contain salts comprising reaction products of strong organic bases with sulfonated fatty alcohols having at least 8 carbon atoms in the molecule.

10. Aqueous treating liquids containing in solution a salt of a sulfuric acid ester of a higher aliphatic alcohol having at least 8 carbon atoms in the molecule with a strong organic base.

11. Aqueous treating liquids containing in solution wetting, penetrating, foaming and dispersing agents consisting essentially of an organic salt of a sulfuric acid ester of a higher aliphatic alcohol having at least 8 carbon atoms in the molecule, said salt having been produced by the reaction of a strong organic base with said ester.

12. Salts of sulfated higher molecular aliphatic normal primary alcohols having at least 8 carbon atoms in the molecule with strong organic bases.

13. Salts of strong aliphatic amine bases with sulfated higher molecular aliphatic normal primary alcohols having at least 8 carbon atoms in the molecule.

14. Fiber treatment liquids containing in aqueous solution a salt of a sulfated higher molecular alcohol having at least 8 carbon atoms in the molecule and having a primary alcoholic hydroxy group with a tertiary aliphatic amine.

15. A pyridine salt of a sulfated higher molecular alcohol which alcohol has the formula ROH, the R being an alkyl radical of at least 8 carbon atoms.

HEINRICH BERTSCH.